June 30, 1964     H. A. LINDQUIST     3,139,265

TURBINE AND PUMP RUNNER

Filed Jan. 28, 1960

*INVENTOR.*
HERMAN ARNE LINDQUIST

BY Hane and Nydick

ATTORNEYS

United States Patent Office 3,139,265
Patented June 30, 1964

3,139,265
TURBINE AND PUMP RUNNER
Herman Arne Lindquist, Trollhattan, Sweden, assignor to Nydqvist & Holm Aktiebolag, Trollhattan, Sweden, a corporation of Sweden
Filed Jan. 28, 1960, Ser. No. 5,254
4 Claims. (Cl. 253—117)

This invention relates to turbines and pumps and, more particularly, to a runner of the Francis type therefor.

With the development of turbine and pump structures, larger and larger units have been manufactured. During the manufacture and development of such large units, various difficulties have been encountered, especially in connection with the precision casting of large stainless steel runners in one piece. In an attempt to overcome these difficulties, welded type construction has been employed for fabricating runner from separately cast blades, hubs and bands. Because of the favorable results obtained with this type of construction, this procedure has now also been adopted for the manufacture of smaller as well as the larger size runners, the only limitation being that the small spaces inside the various blade channels must be accessible for such welding operations.

While such welded technique has numerous advantages, one of the disadvantages thereof is that the fabricated bands and hubs of such large runners are extremely heavy, cumbersome, and expensive to cast. Another disadvantage is that the ends of separately cast blades must be machined to fit very accurately upon the band and hub of the runner if such welding is to produce satisfactory results. Such fitting is, in most instances, carried out by hand, often according to designed templates and fixtures. Still another disadvantage of such welding methods is that very many welds must be made for welding heavy blades, mostly butt welds. Such extensive welding entails high costs due to the fact that such welding must be done by hand, and more often than not in inconvenient electrode positions.

In order to avoid at least partly the aforementioned disadvantages of welding methods, due to the requirements of accurate fitting and extensive welding, slowly running types of small runners have been employed; i.e., runners having a small ratio of height to diameter. In the fabrication of this type of runner, parts of the blade have been allowed to protrude through the hub and the band to be welded to the exterior thereof. This type of construction has been possible because of the relatively thin hub and band and because the shape of the blades of this type of runner is of smaller curvature in its vertical direction. Accordingly, this procedure cannot be applied with favorable results to large runners, or to any other types of runners other than the slowly running types hereinbefore described. It is therefore an object of the present invention to produce a runner of welded construction which is of relatively light weight, extremely strong, and which will overcome the aforementioned difficulties.

Another object of the present invention is to provide a runner of the type described having a hub and band of substantially welded box or shell type construction which may be readily fabricated in a simple and convenient manner.

All of the foregoing and still further objects and advantages of this invention will become apparent from a study of the following specification, taken with the accompanying drawing, wherein.

Figure 1:
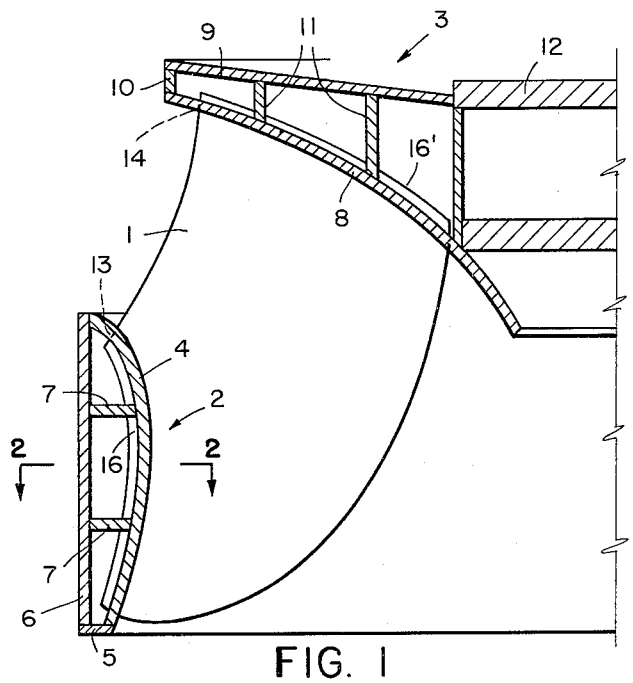
FIGURE 1 is a fragmentary longitudinal cross-sectional view of certain parts of a turbine made in accordance with the present invention.
Figure 2:
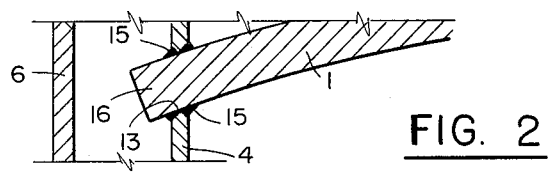
FIGURE 2 is an enlarged fragmentary cross-sectional view taken along line 2—2 of FIGURE 1.

Referring now to the drawing, and more particularly to FIGURES 1 and 2 thereof, a runner made in accordance with the present invention is shown to include a plurality of curved blades 1, each extending radially between a welded shell type band 2 and a welded shell type hub 3.

The band 2 includes an outwardly concave inner ring 4, symmetrical with respect to the axis of rotation, a substantially cylindrical outer ring 6, and a radially extending annular bottom ring 5 which peripherally connects the lower ends of the inner and outer rings together, the upper ends of such rings being in peripheral abutment with each other. If desired, the band 2 may be further rigidified to resist deformation, by annular reinforcing struts 7 which are welded to the outer ring 6 and extend inwardly toward the concave side of the inner ring 4.

The hub 3 includes a lower part 8, an upper part 9, and a radially outwardly disposed annular ring 10 which connects the outermost ends of the lower and upper parts together. A central unit 12 integrally connects the innermost ends of the lower and upper parts 8, 9 of the hub together and provides means for connecting a shaft thereto, such as by bolts. The hub 3 may also be additionally reinforced by annular struts or rings 11 that extend between the central portions of the lower and upper parts of the hub.

Because of the shell type of construction of the band and hub, the inner ring 4 and lower part 8 are relatively thin compared to the overall thickness of these sections, and each such inner ring and the lower part 8 are provided with accurately formed aligned slots 13 and 14 for receiving the opposite ends of each blade 1 therethrough. Welds 15 are used to secure the opposite ends of each such blade 1 within the defined slots 13 of each of the inner ring 4 and lower part 8 of the runner, each such weld 15 being of generally smaller volume than would be required to weld such blades to a band or hub of solid construction. The ends 16 and 16' of the blades need not be machined at the time they are initially inserted through the slots of the band and hub, as they may be machined simultaneously during a single turning operation and then welded to outer ring 6.

Figure 3:
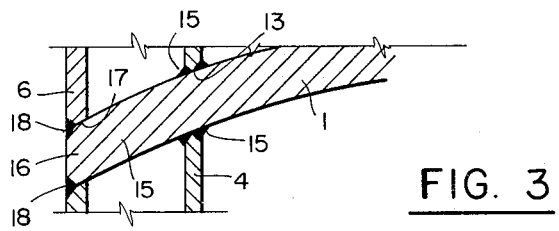
FIGURE 3 is a view similar to FIGURE 2, and showing a slightly modified form of construction.

With reference now to FIGURE 3 of the drawing, a slightly modified form of construction is shown wherein the ends 16 of each blade extend further through slots 17 provided in either one or both, the outer ring 6 of the band and upper part 9 of the hub, and integrally secured therewithin by welds 18. In this arrangement, the blade portions of each blade 1 between rings 4 and 6 and parts 8 and 9 replace the reinforcement struts 7, 11 hereinbefore described as extending between the respective sections of the band and hub parts.

Because of the shell type construction of the present invention, it is possible to fabricate separate parts of such runners, to be later transported and assembled at an assembly point remote from the point of manufacture or in situ. This facilitates the handling and transportation of such large turbine runners in a manner heretofore not possible. In any case, the joints between the various parts of the runner must be extremely strong as the runner is subjected to severe stresses during operation. However, when as heretofore known the hub and band are of solid construction, any openings later formed in such elements cause a subsequent weakening of the parts, thus reducing the stresses to which it may be safely subjected. Any welding of such thick walled parts would introduce deformations and welding stresses exceeding permissible values.

The present invention also permits the use of a screw flange joint at the center of gravity of the section, or of a shrink-ring joint which keeps the different parts together without damaging the area of the section. In addition, the thin walled parts of the shell type construction of the present invention may be welded together without any deformations, so that the runner actually becomes a single integral unit. This is a substantial advantage since it avoids any risk that the screw of shrink-ring joints which could be taken apart, will be subjected to fatigue due to vibrations and consequential loss of their connecting strength.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A turbine and pump runner having a substantially large height to diameter ratio comprising, in combination, a hub extending substantially in a plane transverse of the axis of rotation of the runner, a band extending substantially in a direction parallel to said rotational axis, and a plurality of blades extending between said band and said hub, said band comprising an inner ring and an outer ring peripherally secured together to define a hollow shell, said hub comprising an upper part and a lower part peripherally secured together to define a hollow shell, said inner ring and said lower part of said hub each having openings therein adapted to receive each of said blades, and the opposite ends of each of said blades being received within said openings and secured therein by a weld of substantially small volume.

2. A turbine and pump runner as set forth in claim 1, including welds of substantially small volumes integrally securing the respective end of each blade to the portions of said inner ring and said lower part defining said openings therethrough.

3. A turbine and pump runner as set forth in claim 1, wherein said inner ring and said outer ring include portions defining openings aligned with each other, and the respective end of each of said blades extends through said openings in said inner ring and said outer ring.

4. A turbine and pump runner as set forth in claim 3, including welds of substantially small volume integrally securing the respective end of each blade to the portions of said outer ring defining the openings therethrough.

References Cited in the file of this patent

UNITED STATES PATENTS

| | | |
|---|---|---|
| 2,658,719 | Johanson | Nov. 10, 1953 |
| 2,848,190 | Barr | Aug. 19, 1958 |
| 2,996,281 | Creek | Aug. 15, 1961 |

FOREIGN PATENTS

| | | |
|---|---|---|
| 74,863 | Austria | Oct. 25, 1918 |
| 171,580 | Austria | June 10, 1952 |
| 72,780 | Denmark | May 27, 1943 |
| 237,963 | Great Britain | Aug. 4, 1925 |
| 255,161 | Great Britain | July 19, 1926 |
| 438,036 | Great Britain | Nov. 11, 1935 |
| 608,703 | Great Britain | Sept. 20, 1948 |
| 823,442 | France | Jan. 20, 1938 |
| 875,984 | Germany | May 7, 1953 |